Aug. 13, 1963     G. E. HANSEN ETAL     3,100,501
REMOVABLE HEAD AND SEAT BALL VALVE CONSTRUCTION
Filed Dec. 23, 1960
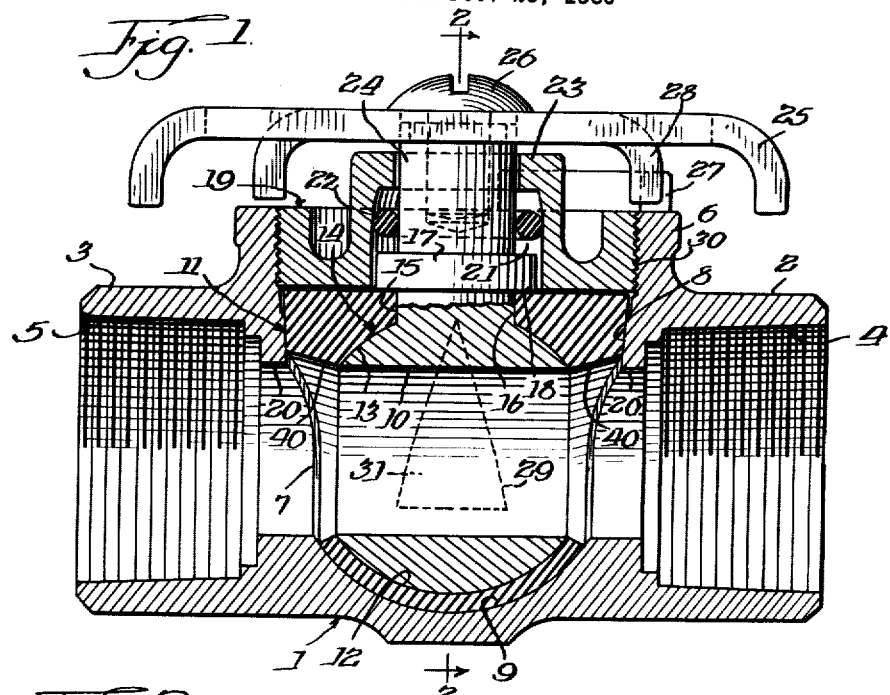
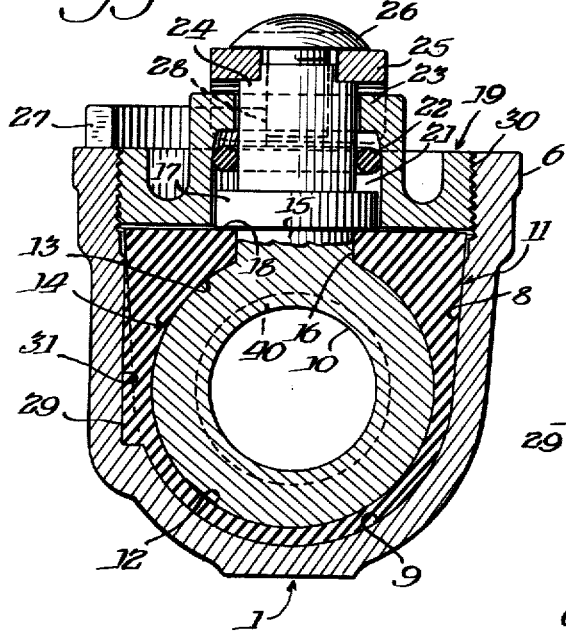
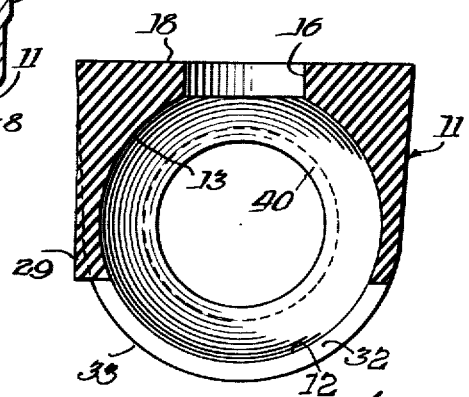
Inventors
George E. Hansen, &
Carl R. Stone.
By Joseph O. Lange
Atty.

United States Patent Office 3,100,501
Patented Aug. 13, 1963

3,100,501
REMOVABLE HEAD AND SEAT BALL VALVE
CONSTRUCTION
George E. Hansen, Elmwood Park, and Carl R. Stone, Lombard, Ill., assignors to Crane Co., Chicago, Ill., a corporation of Illinois
Filed Dec. 23, 1960, Ser. No. 77,901
5 Claims. (Cl. 137—454.6)

This invention relates generally to a new and improved form of seating member for rotary valves, in which the latter employ a spheroidal types of closure member for effecting the opening and closing of the valve. More specifically, it is concerned with a new improvement in a ball valve construction.

It has for one of its principal objects the provision of a unique design of valve in which a molded rubber or composition ported plug is used to encompass the closure member and in which preferably, although not necessarily, a ball or spheroidal type of closure member is molded in place, while at the same time predeterminately permitting relative rotative movement therebetween to provide for said valve opening or closing.

Another important object is to provide for a ball valve seat construction in which both the spheroidal closure member and also the valve actuating means, such as the stem, is suitably molded and encased or received at least in part therewithin, whereby to provide for the development of a suitable contour in the rubber or composition seat to coincide closely and accurately with the outer surface of the spheroidal member as well as with that portion of the stem encased by said rubber or composition.

Another object is to provide for a valve seating means, such as a molded composition tapered plug, which when inserted in the valve provided with a matching taper and end-rounded portion permits of a desirable metal-to-metal or composition contact therebetween for effecting fluid tightness.

A still further object is to provide for a valve construction in which by suitably tightening of a valve cap or gland member, the composition or rubber is pressed between the tapered body and the ball closure member whereby to provide for suitable compression and fluid sealing all critical surfaces to permit a positive and leak-proof joint between the metal surfaces of the valve body and the interposed seating member of a suitable hollow mass configuration of this invention.

A further object of this novel valve design is to provide for a suitable taper or conical bore in the valve body whereby an even loading or mechanical pressure applied on the rubber or composition seat member is transmitted to the spheroidal member or ball closure to effectively prevent fluid leakage therepast.

A still further object is to provide for a valve seating construction in which the coextensive molding of the rubber or composition mounting around the valve stem provides a combined seat and closure and also a packing or stuffing box for the valve.

A still further object is to provide for a valve construction in which a large mass of rubber or plastic composition at the upper portion of the valve chamber allows for a squeezing effect to be applied so as to seal the side walls thereof relative to the body and to simultaneously press the rubber or composition around the valve stem to provide in all locations for a fluid tight arrangement of elements.

Other objects and advantages will become more readily apparent upon proceeding with the following description read in light of the accompanying drawings, in which:

FIG. 1 is a sectional assembly view of a preferred embodiment of our invention;

FIG. 2 is a transverse sectional assembly view taken on the line 2—2 of FIG. 1; and FIG. 3 is a sectional view of a modified form of the seat member constituting this invention.

Similar reference numerals refer to similar parts throughout the several views.

Referring now to FIG. 1, a valve casing or body generally designated 1 is shown with the usual end connecting portions 2 and 3. In this case, it is provided with respective pipe threads 4 and 5, for attachment to a fluid pipe line (not shown). In the latter connection, it will be appreciated that the form of the casing connecting ends is of no particular moment in this invention, and obviously the connection to the pipe line may be made either by flanges, welding, soldering, brazing, or the like.

The valve body at its upper portion is provided with the preferably transverse integral body extension or hub 6. Between the pipe attachment portions, the valve body 1 is provided with the centrally located chamber 7, which as indicated at 8 is preferably, but not necessarily, of annularly tapered or frusto-conical configuration. The ports 20 connect the chamber with the valve end openings 5 and 6. The said valve chamber at its lower end portion is preferably rounded and of spheroidal configuration, as indicated at 9, whereby to receive the molded mass or valve seat member generally designated 11. The lower interior portion of the member 11, as indicated at 12, is also of spheroidal shape and at its upper annular portion is similarly formed. Within said hollow portion of the seat 11, the valve closure member generally designated 14 and also of spheroidal form is snugly received. The said valve closure member is provided with a through port 10, through which line fluid flows when the valve is open as illustrated. Forming a connecting passage for port 10 with the ports 20 of the body are the interposed ports 40 of the seat member 11. The latter ports may be annularly tapered as illustrated, but this is not indispensable. In connection with the snug type of fit between the closure member and seat member 11, it should be understood that the said closure member is suitably molded in place, that is, the said seat member is actually formed in its inception by said molding around the closure member 14 thereby to insure the snugness of fit therebetween referred to above.

Preferably integrally attached thereto, an actuating means for rotating the closure member such as the stem portion 15 projects through the opening 16 of the seat member 11 and at its upper portion is provided with the stem collar 17, which bears annularly against the upper surface 18 of the molded seat 11. As shown, the said stem collar fits relatively loosely within the threaded cap generally designated 19 provided with the chamber 21 to permit desirable flexibility and slight transverse movement in response to fluid pressure. The stem is sealed at its upper portion by means of the O-ring 22 and is capped by the inwardly extending flanged portion 23 apertured to allow for the projection therefrom of the stem extended portion 24 upon which a handwheel 25 is suitably mounted. It is held in place in the usual manner by means of the cap screw 26.

As indicated, the valve body portion 6 at its upper limit is provided with a stop 27 thereon arcuately extending predeterminately as illustrated to inhibit the rotation of the valve closure member 14 relative to the seat 11 to approximately 90 degrees of movement of the latter by engagement of the indicator or pointer 28 with end limits of the stop predeterminately in the normal course of its rotation in opening or closing valve operations. As shown in dotted lines at 29 and perhaps more clearly indicated in FIG. 2, the mass seating member 11 for purpose of positively preventing its rotation relative to the casing 1 when valve closure 14 is rotated is provided with the lug 29 snugly engaging the body recess 31.

It will, of course, be appreciated that by suitably tightening the threaded cap member 19 on its threads 30 it is relatively easy to permit of pressing or applying uniform load or thrust onto the seating member 11, which is transmitted to the spheroidal closure member 14 to prevent fluid leakage past the spheroidal surfaces 12 and 13, as well as past the body and seating surface portion 9 of the casing. In considering the above description, it will be noted that the seating member 11 has been referred to as being molded around the closure member 14 and the stem 15. However, this molding requirement need not necessarily be followed, as more clearly made apparent in the structural modification described immediately below.

Referring now to FIG. 3, the seating member generally designated 11 in this modification is molded as a separate piece independently of the spheroidal closure member. It is transversely slotted as at 32, which may be made to minimum dimensions, say of a thickness of the order of a few hundredths of an inch, or of a saw blade. This permits the respective halves 33 of the seat member to be easily and conveniently spread apart when in assembly with the closure member 14 it becomes necessary to slip the aperture 16 over the stem portion 15 and insert the said closure member. Thus, it will be clear that upon compression when assembled in the valve body 1 in the manner shown and described in connection with FIGS. 1 and 2, similar beneficial fluid sealing results will follow from such interposition insofar as effecting even loading or compression on the closure member is concerned. Actually, the slit 32 will return by its elasticity to its unspread form, closing in snugly over the ball closure member and forming a fluid sealing contact over its outer surfaces with its portions 12 and 13. In other respects, the method of valve sealing operation of this modified construction is identical to that hereinabove given for the previous figures.

In summary, it will be apparent that both forms of the invention possess the advantage that the molding of the rubber or composition around the valve member provides for a combined fluid tight seat enclosure and stuffing box and further that the large mass of rubber or composition at the top of the valve body as at the frusto-conical portions 8 allows for effective conformation of the composition to take place so as to seal the side walls of the seating member 11 to the valve body 1 and also to force or compress the composition around the stem at 15 under the influence of the transverse load applied thereto by the threaded cap 19.

It will be further apparent that a compact, sturdy, and relatively trouble-proof ball valve construction has been provided and the embodiments set forth represent modifications merely to illustrate preferred embodiments of the invention.

The claims should therefore be measured by the state of the art to which this contribution is related.

We claim:

1. A valve comprising a casing with an inlet and outlet and a substantially frusto-conical valve chamber therebetween having inner end surface limit defined by a curved surface of spheroidal configuration;

(a) a one-piece hollow flexible ported frusto-conical seat member with an inner rounded imperforate wall portion of the same configuration as the said valve chamber inner surface limit and being nonrotatably mounted in said casing to substantially cover the wall surfaces defining the said valve chamber;

(b) a spheroidal ported valve closure member fitted closely within said seat member and being rotatable thereto in opening and closing the valve;

(c) the said imperforated wall portion being of uniform thickness to fill a uniform space between the said spheroidal closure member and the curved surface end portion of the valve chamber whereby to effect uniform distribution of the compression load between the curved surface end limit of the casing chamber and the said spheroidal closure member;

(d) and means cooperating with an upper portion of the casing to bear against an upper outer surface portion of the said flexible seat member to effect increased compression load by the said seat member applied respectively between the said closure member;

(e) the inner rounded imperforate wall portion of the said seat member and the said frusto-conical wall surfaces defining the said valve chamber.

2. A ball valve comprising a casing with an inlet and outlet and a substantially frusto-conical valve chamber therebetween defined at its inner smaller end by a substantially spheroidal surface;

(a) a unitary hollow distortable seat member nonrotatably engaging said substantially spheroidal inner surface of said casing, and substantially covering the frusto-conical wall surfaces and the spheroidal inner end surface defining the said valve chamber;

(b) a spheroidal type of ported rotatable closure member enclosed within said seat member to engage a similar substantially spheroidal inner surface therein of a smaller radius than the radius of the spheroidal surface of the said casing;

(c) the space between the respective radii of the casing and inner end of the closure member being uniform throughout said space formed by said radii;

(d) at least one projecting means interposed between the said casing and seat member to hold the seat member against rotation;

(e) and cap means mounted on the casing bearing against an upper exposed area of the said flexible seat member of thickened cross-section to distort the latter portion of the seat member so as to superimpose axial loading uniformly through the said member respectively against the said closure member;

(f) the casing tapered annular wall surfaces and the casing spheroidal inner end surface defining the said substantially frusto-conical valve chamber whereby to form the said seat member to completely occupy the said space between the walls defining the said casing valve chamber and the said closure member to effect continuous fluid sealing contacts with the said closure member, cap means and casing.

3. The subject matter of claim 2;

(a) stem actuating means for rotating said closure member;

(b) the said seat member enclosing said closure member and at least a portion of said stem actuating means projecting outwardly of the seat member;

(c) the said cap means on the body predeterminately deforming the said seat member to coincide closely with outer surfaces of the said closure member, said cap means, and the said portion of the stem actuating means to form simultaneously fluid seals therebetween.

4. The subject matter of claim 1, the said seat member being transversely slotted across an inner end portion thereof whereby to facilitate assembly of said seat member with said closure member.

5. The subject matter of claim 1, at least a portion of the spheroidal inner surface of the said unitary seat member being slotted therethrough to permit spreading apart of the slotted portion of the said seat member to allow for the insertion of the said closure member snugly into the said seat member in the course of valve assembly.

References Cited in the file of this patent

UNITED STATES PATENTS

| | | |
|---|---|---|
| 860,217 | Jackson | July 16, 1907 |
| 2,063,699 | Schellin | Dec. 8, 1936 |
| 2,271,349 | Saurer | Jan. 27, 1942 |
| 2,387,013 | Fuller | Oct. 16, 1945 |
| 2,710,623 | Kolos | June 14, 1955 |
| 2,751,930 | Redner | June 26, 1956 |
| 2,766,961 | Meusy | Oct. 16, 1956 |
| 2,905,197 | Janes | Sept. 22, 1959 |
| 2,958,592 | Heath | Nov. 1, 1960 |

FOREIGN PATENTS

| | | |
|---|---|---|
| 690,367 | Great Britain | Apr. 15, 1953 |
| 723,306 | Germany | Aug. 1, 1942 |

UNITED STATES PATENT OFFICE
CERTIFICATE OF CORRECTION

Patent No. 3,100,501                                        August 13, 1963

George E. Hansen et al.

It is hereby certified that error appears in the above numbered patent requiring correction and that the said Letters Patent should read as corrected below.

Column 1, line 12, for "types" read -- type --; column 2, line 33, for "5 and 6" read -- 4 and 5 --; column 4, line 16, after "rotatable" insert -- relative --; line 18, for "imperforated" read -- imperforate --; line 30, strike out the semicolon; line 31, for "(e)" read -- and --; same column 4, line 40, after "casing" strike out the comma.

Signed and sealed this 31st day of March 1964.

(SEAL)
Attest:
ERNEST W. SWIDER                                             EDWARD J. BRENNER Attesting Officer                                                  Commissioner of Patents